United States Patent [19]

Masuda et al.

[11] Patent Number: 5,248,415
[45] Date of Patent: Sep. 28, 1993

[54] HIGH SPEED UPWARD FLOW FILTRATION APPARATUS

[75] Inventors: Katsuhide Masuda, Yokohama; Yoshinori Kuba, Tochigi; Takashi Yamaguchi, Tochigi; Katsuji Ide, Tochigi, all of Japan

[73] Assignee: Mitsuimiikekakouki Kabushiki Kaisha, Tokyo, Japan

[21] Appl. No.: 880,108

[22] Filed: May 6, 1992

[30] Foreign Application Priority Data

Oct. 18, 1991 [JP] Japan ............................ 3-297756

[51] Int. Cl.⁵ .............................................. B01D 24/04
[52] U.S. Cl. ........................................ 210/154; 210/275; 210/351; 210/411; 210/496
[58] Field of Search ............... 210/154, 241, 289, 496, 210/350, 351, 275, 276, 291, 411

[56] References Cited

U.S. PATENT DOCUMENTS 4,776,962 10/1988 Wakeman ..................... 210/351

FOREIGN PATENT DOCUMENTS 1-249113 10/1989 Japan .

Primary Examiner—Peter Hruskoci
Assistant Examiner—Robert James Popovics
Attorney, Agent, or Firm—Joseph C. Mason, Jr.; Ronald E. Smith

[57] ABSTRACT

In a high speed upward flow filtration apparatus, an upper perforated panel for receiving a fibrous lump is secured to a circumferential side plate for receiving the fibrous lump. A lower movable perforated panel for receiving the fibrous lump is vertically moved by a vertical motion cylinder, and fitted into the circumferential side plate for receiving the fibrous lump under the upper perforated panel for receiving the fibrous lump. A filter layer is formed by filling the fibrous lump between the upper perforated panel for receiving the fibrous lump and the lower movable perforated panel for receiving the fibrous lump. An unfiltered water supply diffuser is provided under the lower movable perforated panel for receiving the fibrous lump. The lower movable perforated panel is raised by the vertical moving cylinder to form a dense and uniform filter layer and to implement a high performance filtration.

6 Claims, 11 Drawing Sheets

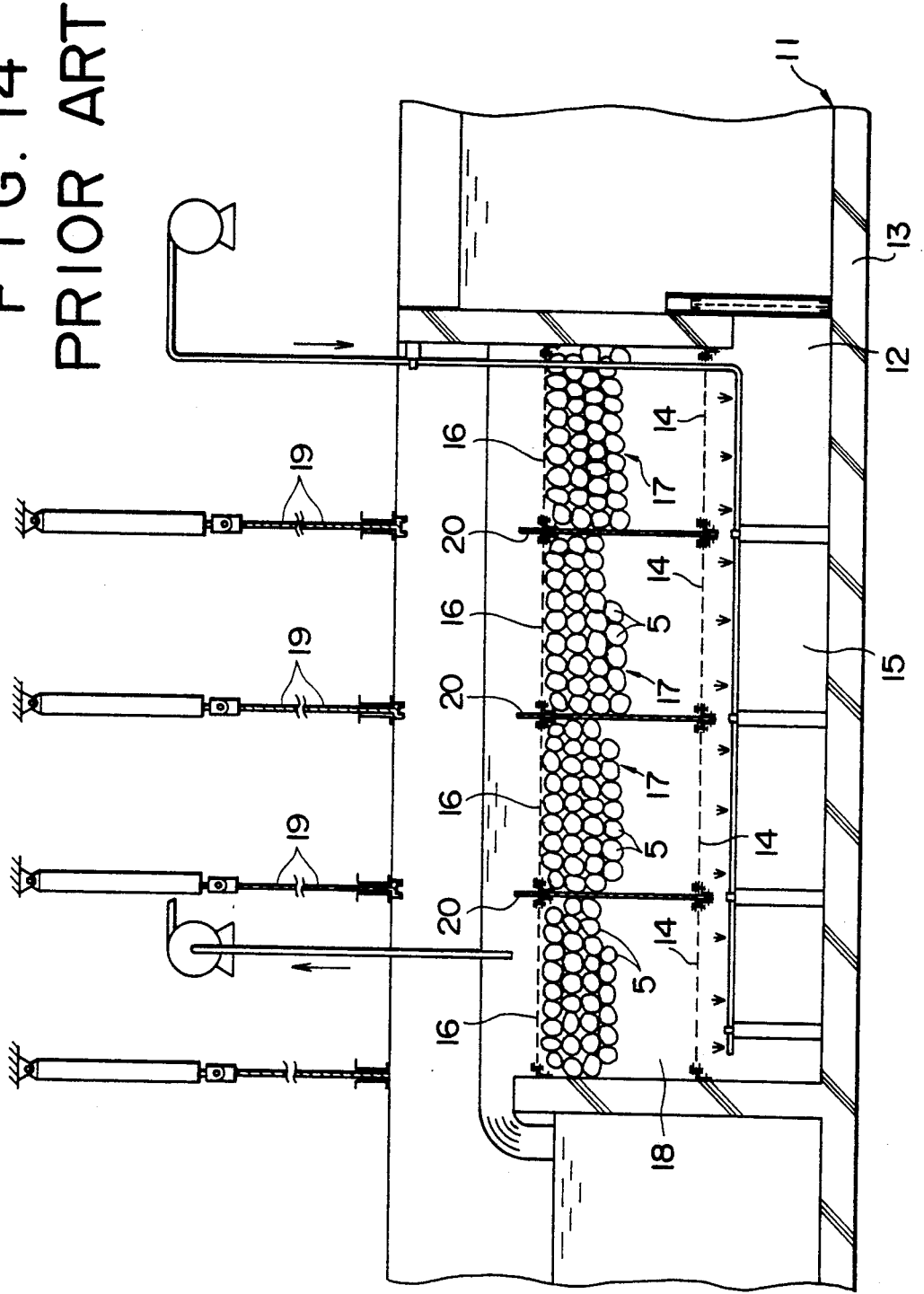

HIGH SPEED UPWARD FLOW FILTRATION APPARATUS

BACKGROUND OF THE INVENTION

1. Field of the Invention

The present invention relates to a high speed upward flow filtration apparatus which an implements a high speed and high performance filtration by providing a filter layer comprising a plurality of fibrous lumps with a uniform thickness, and raising water having fine solid materials to pass through the filter layer.

2. Description of the Prior Art

An apparatus for filtering a stream in a channel is well known in the art as disclosed in Japanese Patent Laid-open No. 1-249113. The conventional filtration apparatus has the following construction as shown in FIG. 14. Water streams from upstream of a channel 11 via a water inlet 12 into a lower chamber 15 which is disposed between a channel bottom 13 and a lower perforated panel 14. The water upwardly streams via the lower perforated panel 14 and an upper perforated panel 16. The upward flow causes each fibrous lump to upwardly float toward the upper perforated panel 16 to form a fibrous lump filter layer 17 under perforated panel 16. As a result, the upward flow is filtered by passing through the fibrous lump filter layer 17.

Fine solid materials in the upward flow adhere to the fibrous lumps 5 in the lower layer of the fibrous lump filter layer 17 as filtration is performed. If a certain amount of the fine solid materials adhere to the fibrous lumps 5, the fibrous lumps 5 can not form the fibrous lump filter layer 17 due to an increased apparent specific gravity of the fibrous lumps 5. Accordingly, the fibrous lumps 5 float in an allowable floating/falling space for fibrous layer 18 or fall on the lower perforated panel 14. Therefore, fresh fibrous lumps 5 are always exposed at the lower portion of the fibrous lump filter layer 17. A filter bed has a horizontal surface to continue the upward flow filtration with lower pressure loss.

Stream velocity can be improved by lowering a vertical movable diaphragm 19 onto a fixed diaphragm 20 when the quantity of running water in the channel 11 is decreased.

In the conventional channel stream filtration apparatus, the fibrous lumps 5 including the fine solid materials in the upstream water have an increased apparent specific gravity. The fibrous lumps 5 float in the allowable floating/falling space for fibrous layer 18 or fall on the lower perforated panel 14 to continue the upward flow filtration with lower pressure loss and to expose the fresh fibrous lumps 5 continuously.

Accordingly, there are disadvantages in that the stream causes the fine solid materials adhering to the floating or falling fibrous lumps 5 to separate from the fibrous lumps 5, and the fine solid materials may pass through the fibrous lumps 5 of the thinned fibrous lump filter layer 17.

Further, in the conventional filtration apparatus, the vertical movable diaphragm 19 should be operated according to the quantity of the stream to increase the velocity of the upward flow. Thereby, the fibrous lump filter layer 17 can be formed. As a result, a complicated operation is required for the vertical movable diaphragm 19.

SUMMARY OF THE INVENTION

It is a first object of the present invention to hold many fibrous lumps between an upper perforated panel and a lower movable perforated panel. The lower movable perforated panel is raised by a vertical motion cylinder to form a filter layer.

It is a second object of the present invention to deform the fibrous lump with pressure by further raising the lower movable perforated panel. Hence, air gaps between the fibrous lumps can be eliminated to form a dense and uniform filter layer.

It is a third object of the present invention to form the dense and uniform filter layer to implement a high performance filtration.

The filter layer using the fibrous lump permits a large void ratio, and a pressure loss accompanied with the fine solid materials is rarely increased even if the fibrous lump is compressed. Thereby, it is a fourth object of the present invention to implement a gravity filtration at a high speed.

It is a fifth object of the present invention to conserve a cleaning chamber in which the fibrous lump can freely move if cleaning is required for the fibrous lump. The cleaning chamber is defined between the upper perforated panel and the lower movable perforated panel by lowering the lower movable perforated panel. It is another object of the invention to recover the spherical configuration of the fibrous lump suitable for cleaning by releasing the fibrous lump from the compressive force. It is another object of the invention to, in the above condition, create an upward flow of water mixed with air by injecting air from a fibrous lump washing diffuser. The fibrous lump washing diffuser is disposed in water at the lower portion of an unfiltered water supply chamber. It is another object of the invention to agitate the fibrous lump by the upward flow to clean easily and rapidly.

BRIEF DESCRIPTION OF THE DRAWINGS

The foregoing and other objects and features of the invention will become apparent from the following description of the preferred embodiment of the invention with reference to the accompanying drawings, in which:

FIG. 14 is a side sectional view showing a conventional cleaning apparatus for a channel stream.

DESCRIPTION OF THE PREFERRED EMBODIMENT

Figure 1:
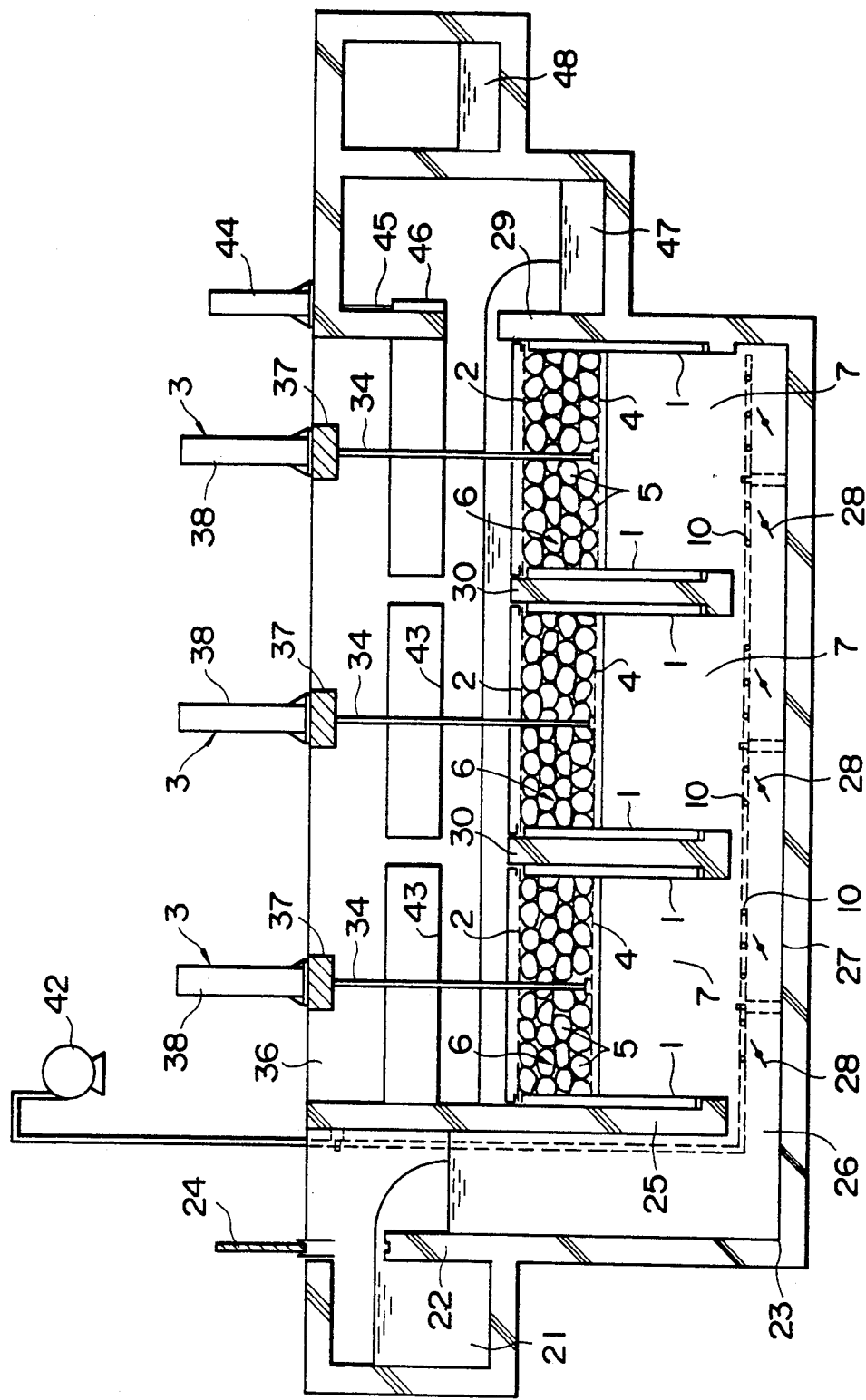
FIG. 1 is a side sectional view showing an embodiment of a high speed upward flow filtration apparatus of the present invention.
Figure 2:
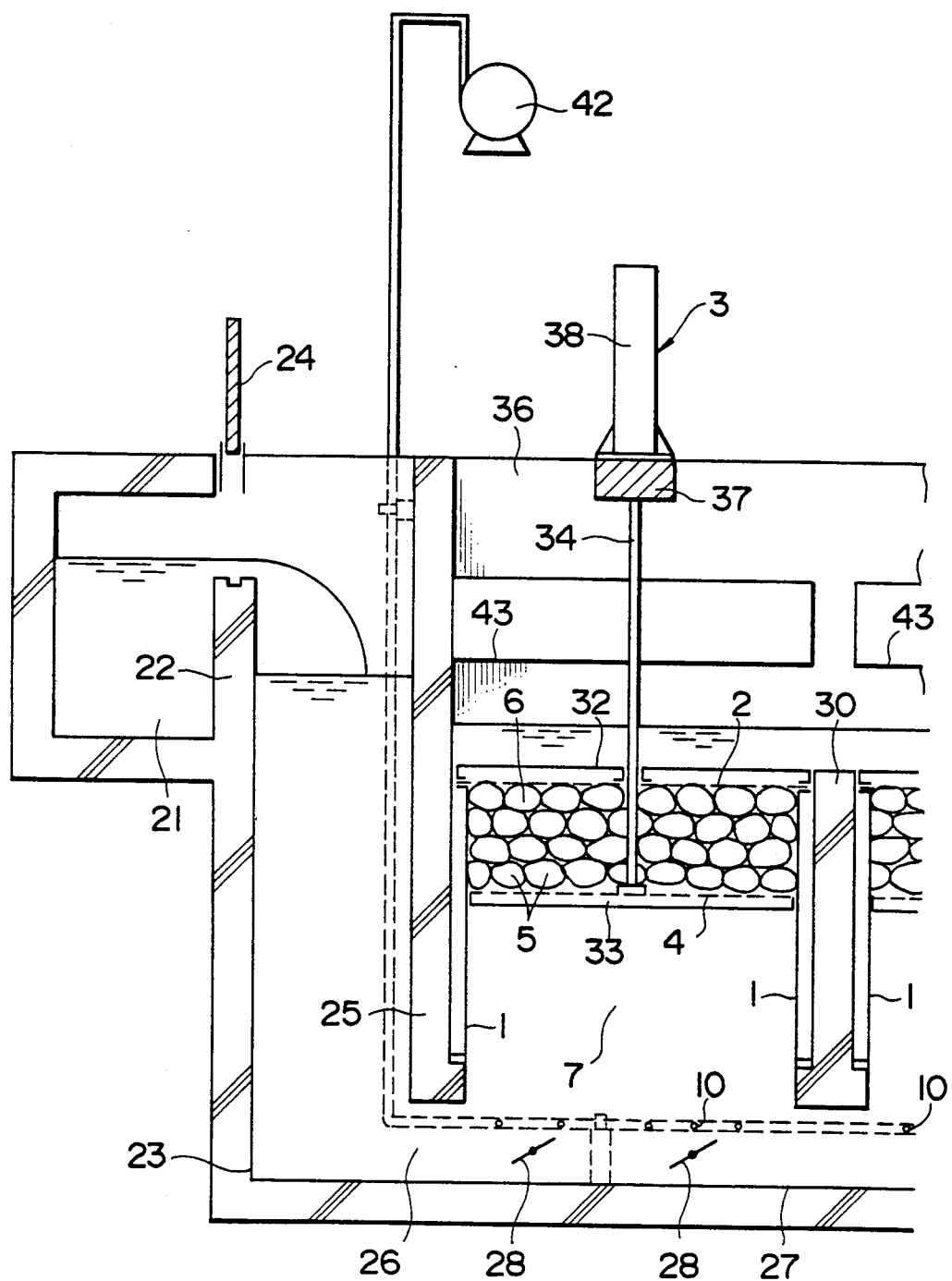
FIG. 2 is a side sectional view showing an enlarged left-hand portion of FIG. 1.
Figure 3:
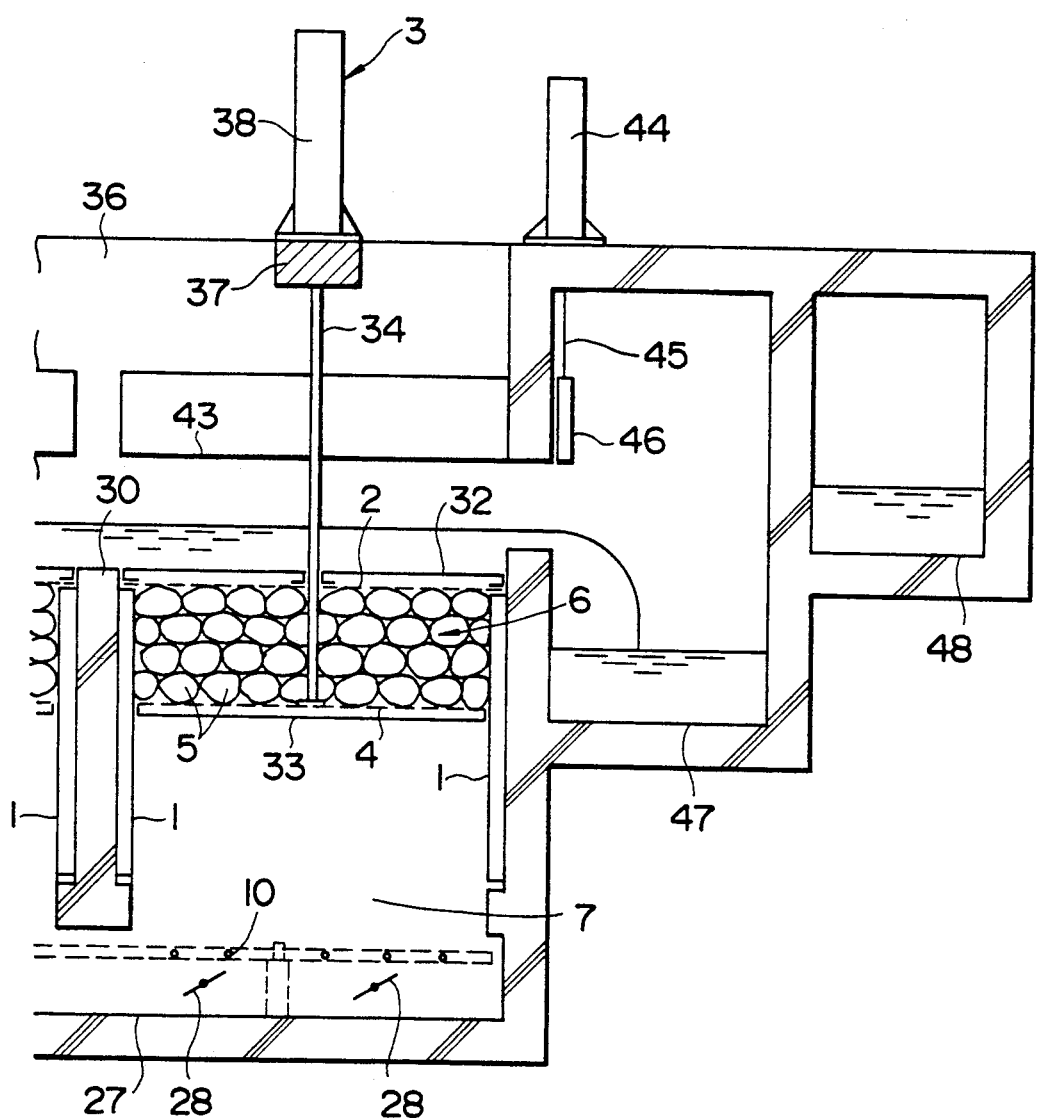
FIG. 3 is a side sectional view showing a enlarged right-hand portion of FIG. 1.
Figure 4:
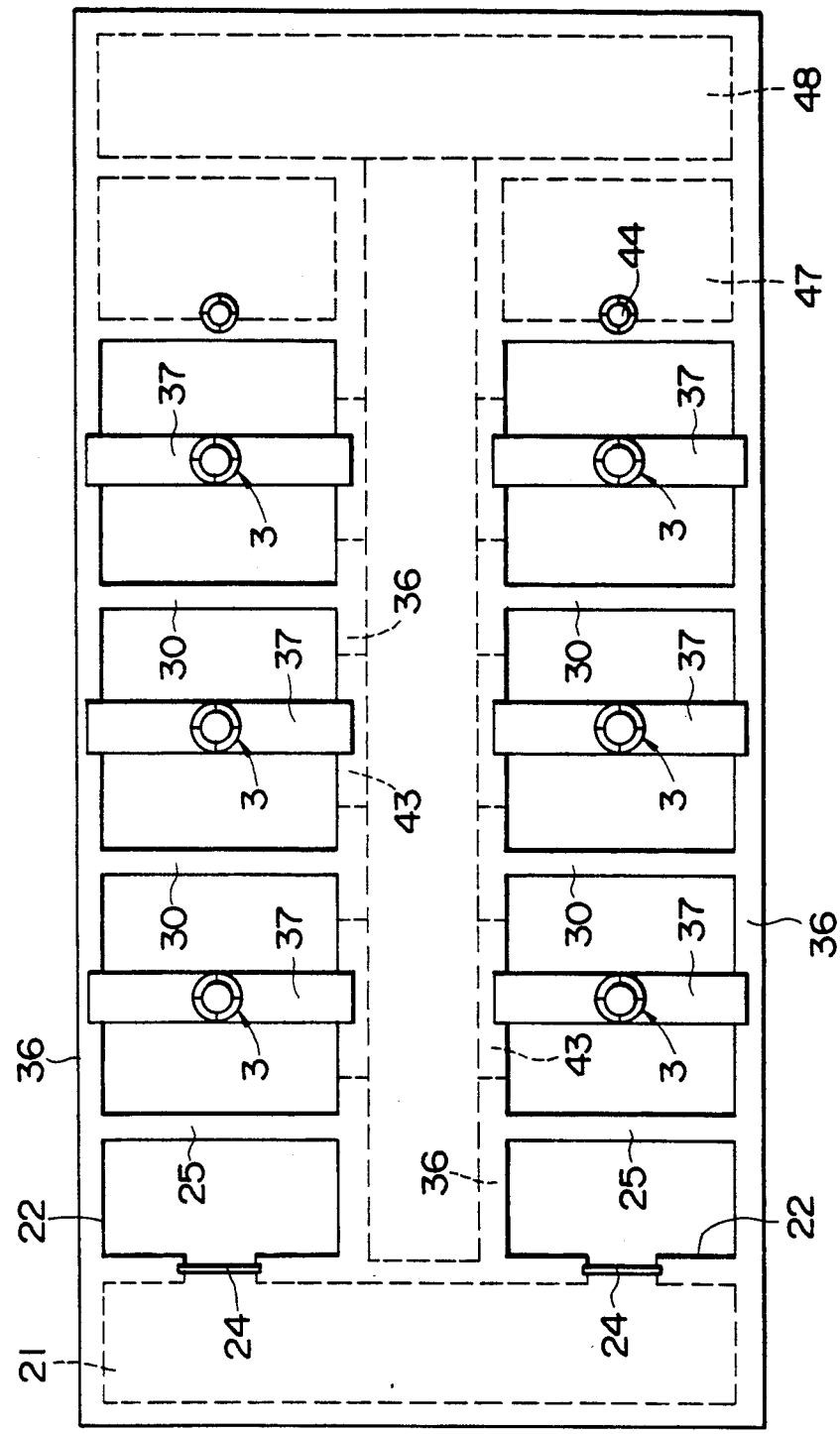
FIG. 4 is a plan view showing the embodiment of the high speed upward flow filtration apparatus of the present invention.
Figure 5:
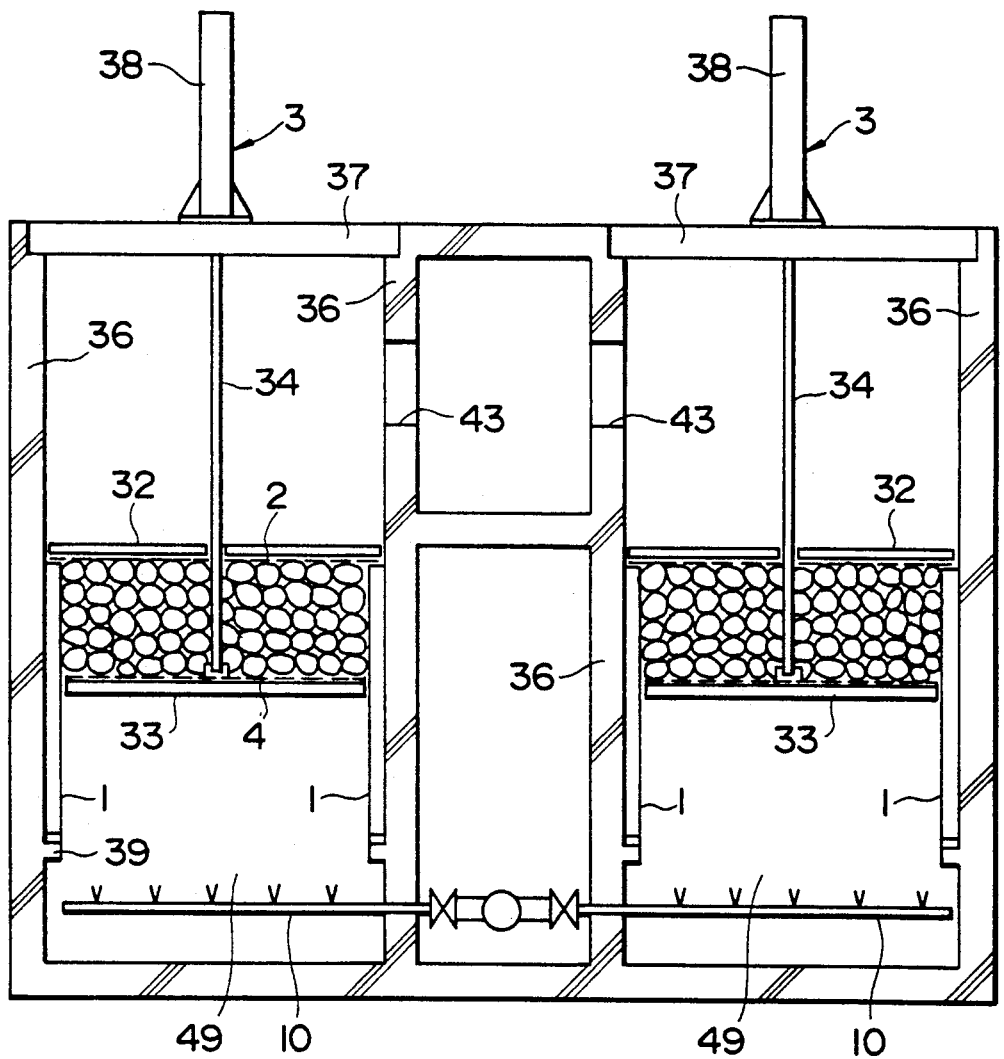
FIG. 5 is a front sectional view showing the embodiment of the high speed upward flow filtration apparatus of the present invention.
Figure 6:
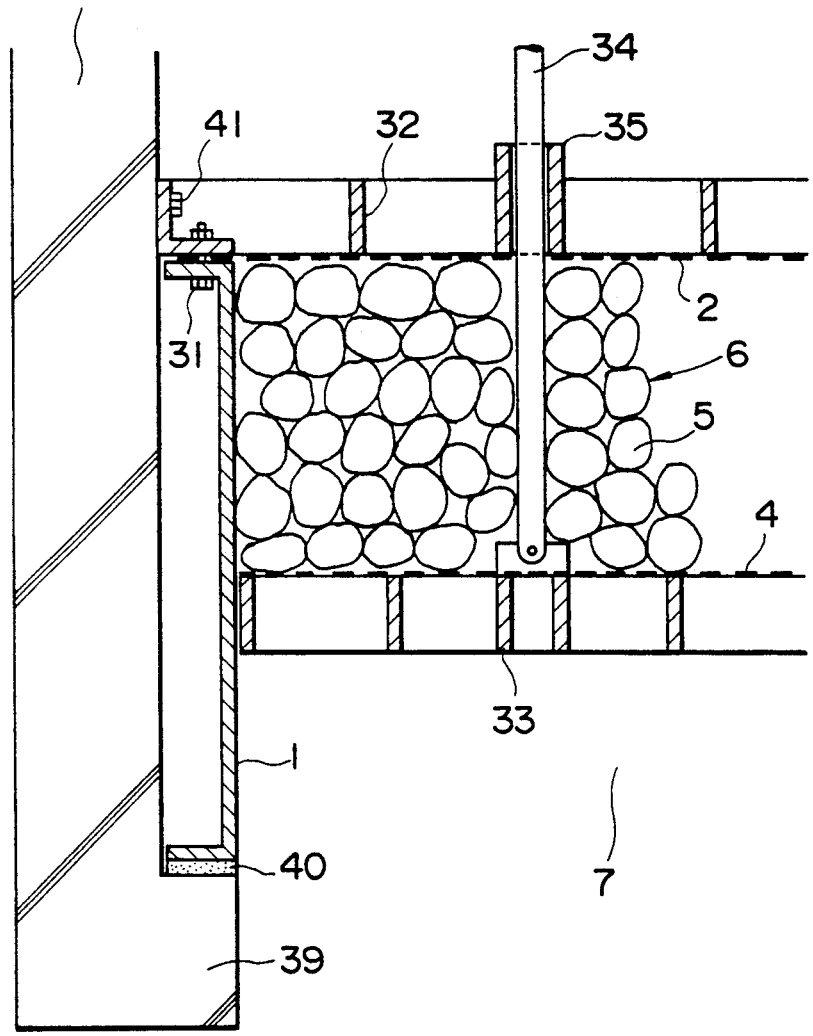
FIG. 6 is a side sectional view showing an enlarged part of the embodiment of the high speed upward flow filtration apparatus of the present invention.
Figure 7:
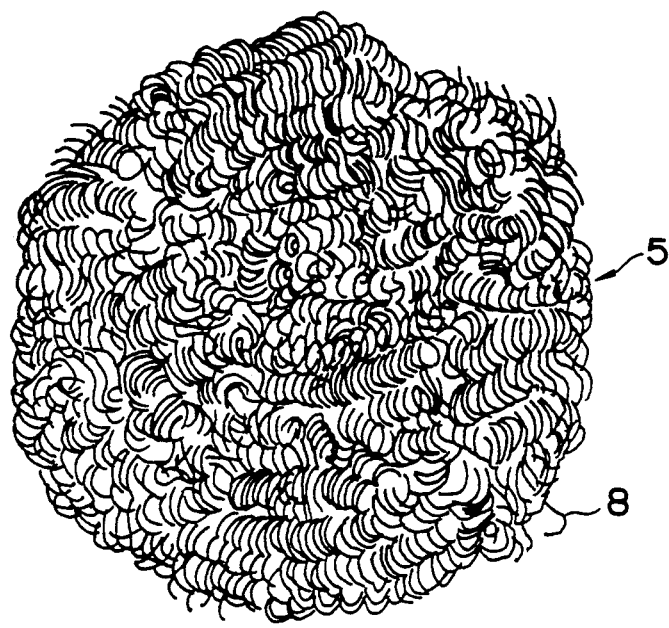
FIG. 7 is a front view of a fibrous lump.
Figure 8:
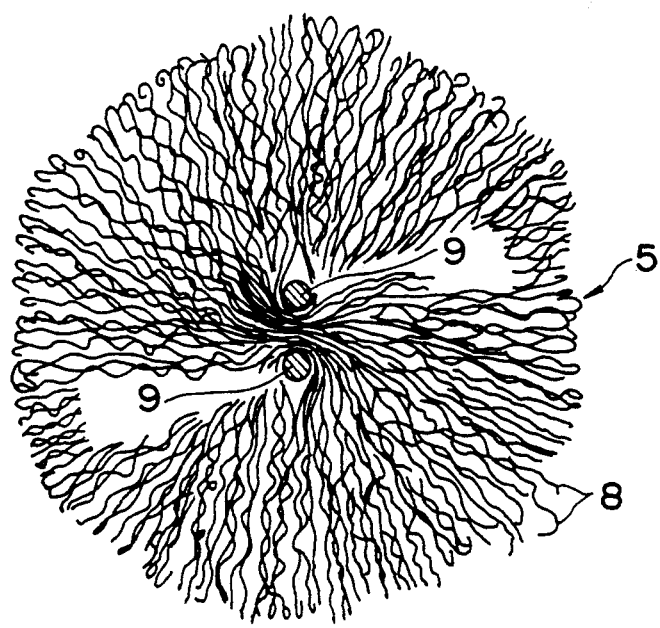
FIG. 8 is a sectional view of the fibrous lump.

FIGS. 7 and 8 show a filtering fibrous lump 5 comprising a crimpy fibrous lump, which is employed in an embodiment of the present invention. The fibrous lump 5 has many bundled crimpy fibers 8 formed by providing synthetic fibers of 20 to 200 denier with 2 to 10 crimps per inch. The bundled crimpy fibers 8 are wrung and bundled at the core portion thereof by a binding wire 9 made of a stiff synthetic fiber, a rigid plastic band, or an anticorrosion metal wire such as an aluminum wire. The bundled crimpy fibers 8 are rounded to provide the fibrous lump 5 in the form of a substantial sphere having a diameter of 10 to 50 mm.

A fiber having a higher specific gravity than water, for example, a polyvinylidene chloride fiber is optimal for the synthetic fiber to constitute the crimpy fiber 8. The synthetic fiber may be a polyvinyl chloride, a polyethylene fiber or other synthetic fibers.

FIGS. 1 through 6 show an embodiment of a high speed upward flow filtration apparatus of the present invention. In the high speed upward flow filtration apparatus, raw water is introduced into a feed water channel 21, and thereafter distributed by a feed water weir 22 to each channel 23. The water can be interrupted by an upstream vertical movable isolation plate 24. The water fed from the feed water channel 21 falls along an upstream weir 25 and is introduced into a channel bottom 27 via a water inlet 26. The water upwardly flows from the channel bottom 27 through current plates 28, and is uniformly distributed to each filter layer 6.

A plurality of fixed diaphragms 30 are provided between the upstream weir 25 of the channel 23 and a downstream weir 29. Holding compressors for the filter layer 6 are disposed between the fixed diaphragms 30.

The holding compressor comprises: four circumferential side plates 1 for receiving the fibrous lump disposed so as to form a vertical square cylinder; an upper perforated panel 2 for receiving the fibrous lump secured to an upper grid frame 32 which is rigidly fixed by bolts 31 on the upper portions of the respective circumferential side plates 1; a lower movable perforated panel 4 for receiving the fibrous lump secured to a lower grid frame 33 which is fitted into a portion rounded by the respective circumferential side plates 1; and a vertical motion cylinder 3 including a fluid pressure cylinder for vertically moving the lower grid frame 33 and the lower movable perforated panel 4. The upper grid frame 32 is fixed by a bolt 41 with respect to the upstream weir 25, the downstream weir 29, the fixed diaphragm 30 and a channel side wall 36.

A piston rod 34 of the vertical motion cylinder 3 vertically movably passes through a guide cylinder 35. The guide cylinder 35 is disposed at an intermediate portion of the upper grid frame 32. The lower end of the piston rod 34 is coupled with the lower grid frame 33. A cylinder 38 of the vertical motion cylinder 3 is secured to a frame 37 which is built and fixed on the respective channel side walls 36. A rubber packing 40 is disposed between the lower end surface of the respective circumferential side plates 1 and upper surfaces of pedestals 39. The pedestals 39 are disposed at lower positions of the upstream weir 25, the downstream weir 29, the fixed diaphragm 30, and the channel side wall 36.

A large number of fibrous lumps 5 are filled into a chamber defined by the upper perforated panel 2, the lower movable perforated panel 4, and the four circumferential side plates 1. The lower movable perforated panel 4 is raised to form the filter layer 6, and further raised to compress the fibrous lumps 5 to form the uniform and dense filter layer 6.

Unfiltered water supply chamber 7 communicating with a channel bottom 27 are provided under the respective lower movable perforated panels 4. Fibrous lump cleaning diffusers 10 comprising an air injection pipe with many injection holes are disposed at the lower portion of the unfiltered water supply chamber 7. The fibrous lump cleaning diffusers 10 are connected to a blower 42 comprising an air blower. A plurality of distributing weirs 43 are provided for the channel side walls 36 at a higher position than that of the downstream weir 29. A downstream isolation plate 46 is disposed above the downstream weir 29, and is vertically moved by a piston rod 45 of a vertical motion cylinder 44.

A filtered water channel 47 is arranged downstream the downstream weir 29, and a catch drain 48 is arranged adjacent to the filtered water channel 47.

The unfiltered water introduced into the feed water channel 21 is distributed to channel 23 by the feed water weir 22. The distributed stream falls along the upstream weir 25, and is introduced into the channel bottom 27 via the water inlet 26. The water upwardly streams from the channel bottom 27, and is uniformly distributed toward the respective filter layers 6 by the current plates 28.

The lower movable perforated panel 4 is raised by the vertical motion cylinder 3 to hold the filter layer 6 comprising many fibrous lumps 5 between the upper perforated panel 2 and the lower movable perforated panel 4. The lower movable perforated panel 4 is further raised to compress a number of fibrous lumps 5 to eliminate air gaps between the fibrous lumps 5, and to form the dense and uniform filter layer 6. The upward flow of the raw water (unfiltered water) rising in the unfiltered water supply chamber 7 is filtered by passing through the filter layer 6. The filtered water overflows out of the downstream weir 29, and is discharged via the filtered water channel 47.

As the water is filtered, fine solid materials in the upward flow progressively adhere to the filter layer 6 from the lower portion to the upper portion thereof in that order. Accordingly, with progressed filtration, resistance to filtration is increased; this raises the water level upstream the water inlet 26.

After filtration for appropriate time period, the downstream isolation plate 46 is lowered to close so that a water level above the respective filter layers 6 rises and the filtered water can pass through the distributing weir 43. In this case, the lower movable perforated panel 4 is lowered to conserve a cleaning chamber between the lower movable perforated panel 4 and the upper perforated panel 2.

Next, air is injected from the fibrous lump cleaning diffuser 10 disposed in water under the unfiltered water supply chamber 7 to cause an upward flow of water mixed with air. Consequently, the fibrous lumps 5 arranged in the cleaning chamber are agitated in water and cleaned, and the cleaning drain is discharged from the distributing weir 43 to the catch drain 48.

After completion of cleaning the fibrous lumps 5, the lower movable perforated panel 4 is raised to form the dense and uniform filter layer 6. Thereafter, air injection from the fibrous lump cleaning diffuser 10 is stopped. Further, the downstream isolation plate 46 is raised to open and filtration can be started again.

It is assumed to use the fibrous lump 5 having a diameter of about 40 mm, which is formed of polyvinylidene crimpy fibers with a true specific gravity more than 1. In this case, if the filter layer 6 is formed without compressing the fibrous lump 5, the filter layer 6 has a void ratio of 93%. Thus, filtration efficiency deteriorates due to air gaps between the fibrous lumps 5, and air gaps between the fibrous lumps 5 and the circumferential side plates 1 for receiving the fibrous lump.

If the fibrous lumps 5 are compressed to reduce the void ratio to about 90%, it is possible to eliminate the unnecessary air gaps and form the dense and uniform filter layer 6. As a result, a high performance filtration can be performed.

When cleaning is required for the fibrous lump 5, the fibrous lump 5 can be recovered to form an original sphere by releasing from the compression. Accordingly, the fibrous lump 5 has a form suitable for cleaning, and can be efficiently cleaned.

The present invention can be carried out by employing the fibrous lumps which can be compacted and released as set forth above as the filter layer 6.

For example, if the fibrous lumps 5 are filled at a density of 75 kg/m$^2$ and the filter layer 6 has a thickness of about 50 cm, a filtration can be performed for filtration quantity of 50 to 100 m$^3$/m$^2$.h.

Referring now to the principle views as shown in FIGS. 9 through 13, a description will be given of a cleaning operation of the high speed upward flow filtration apparatus of the present invention.

Figure 9:
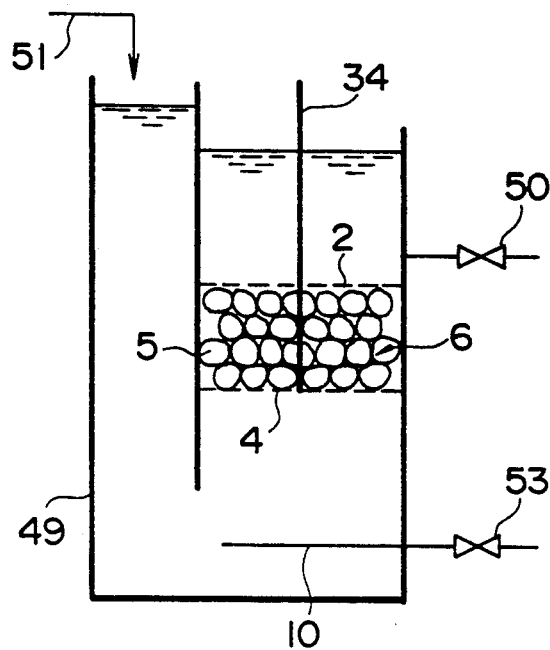
FIG. 9 is a principle view showing a state where a filter layer is formed.

As shown in FIG. 9, when the lower movable perforated panel 4 for receiving the fibrous lump is raised, the fibrous lumps 5 are held to form the filter layer 6 between the upper perforated panel 2 and the lower movable perforated panel 4.

Figure 10:
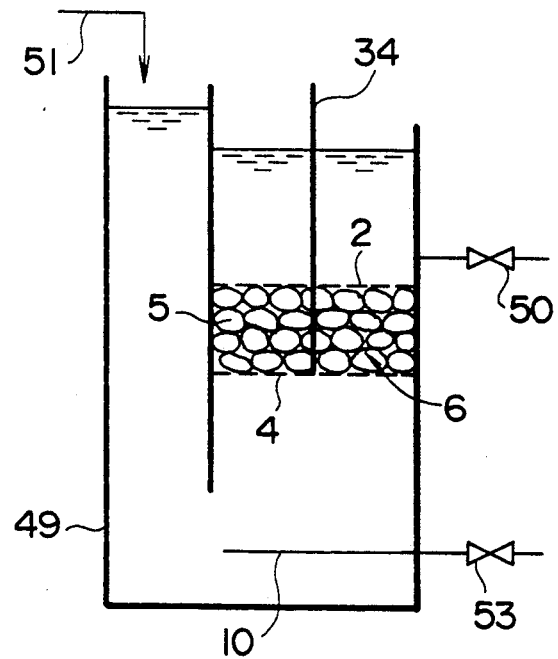
FIG. 10 is a principle view showing a state where the filter layer is compressed.

If the lower movable perforated panel 4 is further raised, as shown in FIG. 10, the fibrous lumps 5 are compressed between the upper and lower panels and deformed. Consequently, the compression allows to eliminate air gaps between the fibrous lumps 5 with each other and air gaps between the fibrous lumps 5 and the circumferential side plates 1. Thus, the dense and uniform filter layer 6 can be formed.

Figure 11:
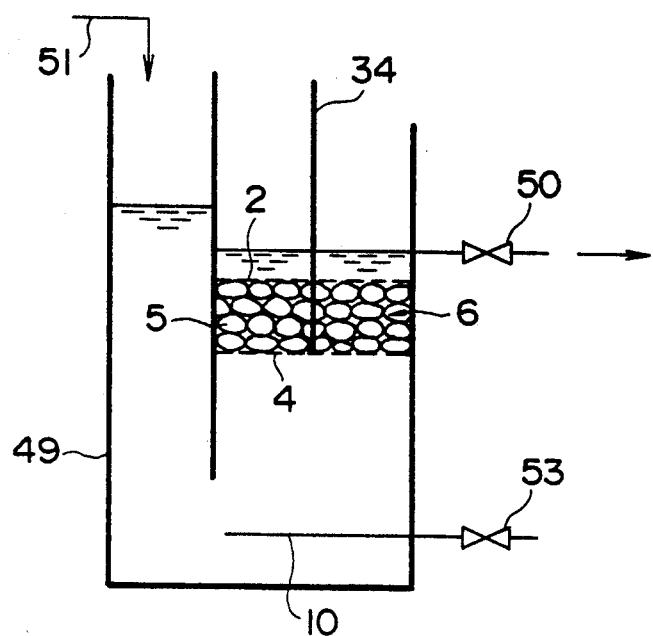
FIG. 11 is a principle view showing a state where a filtration is performed.

Next, when a filtered water exhaust valve 50 connected to a water tank 49 above the filter layer 6 is opened, the raw water 51 fed in the water tank 49 upwardly passes through the filter layer 6. Hence, the filtration is started as shown in FIG. 11.

Figure 12:
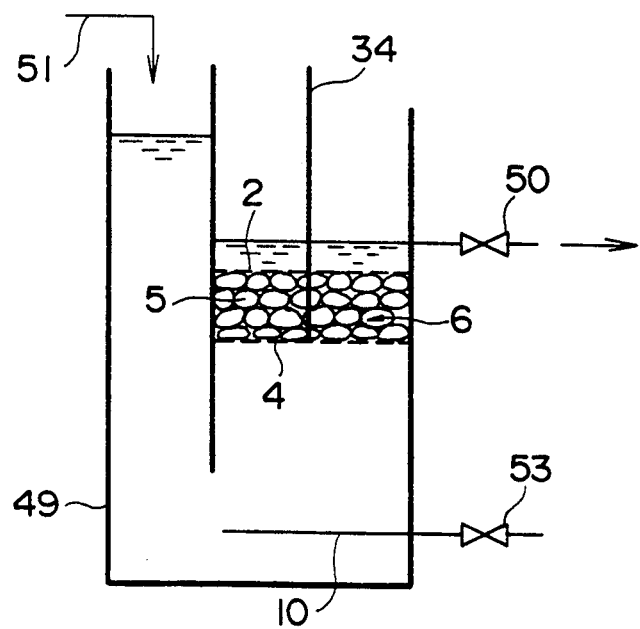
FIG. 12 is a principle view showing a state where an upstream water level is increased.

With the progressed filtration, fine solid materials adhere to the fibrous lumps 5. Accordingly, the pressure loss of the filter layer 6 is increased so that the upstream water level is raised as shown in FIG. 12.

Figure 13:
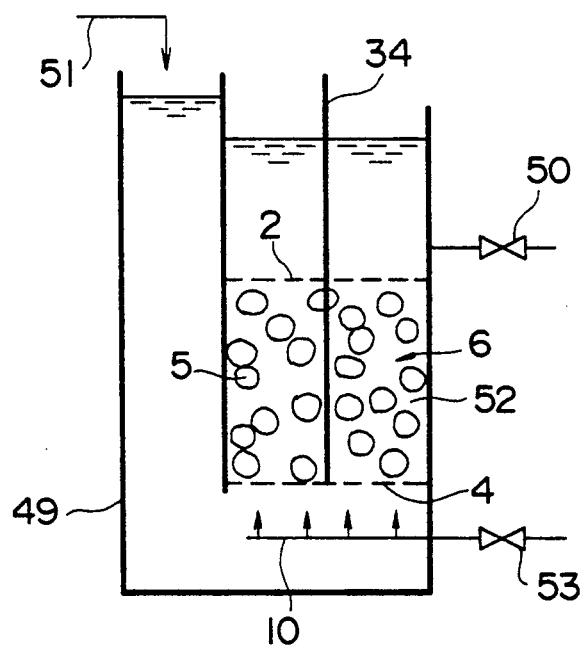
FIG. 13 is a principle view showing a state where the fibrous lumps are cleaned.

With the further progressed filtration, the filtration performance is reduced and it is necessary to clean the fibrous lumps 5. Thus, as shown in FIG. 13, the filtered water exhaust valve 50 is closed to raise the water level above the filter layer 6 so that the filtered water overflows and can be discharged. At this time, the lower movable perforated panel 4 is lowered to define the cleaning chamber 52 between the upper perforated panel 2 and the lower movable perforated panel 4. Furthermore, an air supply valve 53 is opened to allow the fibrous lump cleaning diffuser 10 to inject air to cause the upward flow of water mixed with air. The upward flow can agitate the fibrous lumps 5 in the cleaning chamber 52 to float, and can clean the fibrous lumps 5.

After completion of cleaning the fibrous lumps 5, as shown in FIGS. 9 and 10, the lower movable perforated panel 4 for receiving the fibrous lump is progressively raised to form the filter layer 6. Thereafter, the air supply valve 53 is closed to stop air injection from the fibrous lump cleaning diffuser 10. Consequently, the filtration is resumed as shown in FIG. 11. The raw water 51 can be continuously let flow all the time, and may be used as back wash water for cleaning.

What is claimed is:

1. A high speed upward flow filtration apparatus, comprising:

an inlet for introducing feed water into said apparatus;

an outlet for discharging filtered water from said apparatus;

a drain for discharging unfiltered water from said apparatus;

a first perforated panel immovably mounted within said apparatus;

a second perforated panel movably mounted within said apparatus and spaced below said first perforated panel;

means for selectively moving said movably mounted second perforated panel toward and away from said first perforated panel, said means being located above said first perforated panel;

a plurality of fibrous lumps disposed between said first and second perforated panels, individual fibrous lumps of said plurality of fibrous lumps being displaced in a direction opposite to an upward flow of filtrate as filtration proceeds as suspended matter is captured by said individual fibrous lumps, said displacement substantially preventing compression of said fibrous lumps so that back-pressure does not substantially increase during filtration;

said first and second perforated panels and said fibrous lumps collectively forming a filtration means;

said first and second perforated panels being spaced apart from one another a first predetermined distance when the apparatus is in a filtration mode of operation;

a cleaning chamber, said cleaning chamber being formed by moving said second perforated panel away from said first perforated panel;

said first and second perforated panels being spaced apart from one another a second predetermined distance when the apparatus is in a back wash mode, said second predetermined distance being greater than said first predetermined distance;

means for selectively agitating said feed water when said apparatus is in said back wash mode;

isolation plate means for closing said outlet when said apparatus is in said back wash mode;

distribution weir means for directing feed water to said drain when said apparatus is in said back wash mode;

whereby cleaning of said fibrous lumps is accomplished by closing said outlet, moving said movably mounted second perforated panel away from said immovably mounted first panel to create said cleaning chamber so that said fibrous lumps may become widely spaced apart from one another, maintaining said inlet open, and activating said means for agitating said feed water so that the level of the feed water within said apparatus rises upon closing of said outlet and so that said feed water at said higher level is directed by said distribution weir means to said drain, said agitation of said feed water serving to clean said spaced apart fibrous lumps within said cleaning chamber; and whereby after said fibrous lumps have been cleaned, said second perforated panel is returned to said first predetermined distance from said first perforated panel and said outlet is opened, said opening of said outlet being effective to lower the level of feed water within said apparatus and to thereby divert said feed water from said drain to said outlet.

2. The apparatus of claim 1, wherein each fibrous lump of said plurality of fibrous lumps includes a generally spherical bundle formed by a plurality of crimpy fibers secured to one another at a core portion thereof by a binding wire means.

3. The apparatus of claim 1, wherein said inlet further includes a feed water channel and a feed water weir over which water in said feed water channel must flow to enter said filtration means.

4. The apparatus of claim 3, further comprising an upstream weir having a submerged lower end under which feed water that has flowed over said feed water weir must flow to reach said filtration means.

5. The apparatus of claim 4, wherein said outlet of said apparatus is provided in the form of a filtered water channel, and further comprising a downstream weir over which filtered water must flow to reach said filtered water channel.

6. The apparatus of claim 1, wherein said means for selectively agitating said feed water includes a fibrous lump cleaning diffuser in the form of an air injection pipe having a plurality of injection holes formed therein, and an air blower for selectively introducing air into said pipe.

* * * * *